US012563630B2

(12) United States Patent
Camara et al.

(10) Patent No.: US 12,563,630 B2
(45) Date of Patent: Feb. 24, 2026

(54) SELECTING SINGLE-LAYER UPLINK TRANSMISSION MODES BASED ON DEVICE TYPES

(71) Applicant: T-MOBILE INNOVATIONS LLC, Overland Park, KS (US)

(72) Inventors: Cherno Camara, Mount Lake Terrace, WA (US); Relin Thomas, Bothell, WA (US); Christopher Thomas Bailey, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 296 days.

(21) Appl. No.: 18/504,948

(22) Filed: Nov. 8, 2023

(65) Prior Publication Data

US 2025/0151150 A1 May 8, 2025

(51) Int. Cl.
*H04W 76/20* (2018.01)
*H04W 24/02* (2009.01)
*H04W 76/15* (2018.01)

(52) U.S. Cl.
CPC ........... *H04W 76/20* (2018.02); *H04W 24/02* (2013.01); *H04W 76/15* (2018.02)

(58) Field of Classification Search
CPC ...... H04W 76/20; H04W 24/02; H04W 76/15
See application file for complete search history.

(56) References Cited

U.S. PATENT DOCUMENTS

| | | | | |
|---|---|---|---|---|
| 2014/0105181 A1* | 4/2014 | Milam | ............. | H04W 36/1446 |
| | | | | 370/332 |
| 2025/0119188 A1* | 4/2025 | Vadapalli | ............. | H04W 72/23 |
| 2025/0184206 A1* | 6/2025 | Yang | ........................ | H04L 27/36 |

* cited by examiner

*Primary Examiner* — Tejis Daya
(74) *Attorney, Agent, or Firm* — SHOOK, HARDY & BACON L.L.P.

(57) ABSTRACT

Systems and methods are provided for establishing single-layer connections between user equipment (UEs) and a telecommunications network based on the UEs' device types. UEs are classified as either stationary devices or mobile devices based on device information, such as subscriber identity module (SIM) profiles. When a multi-layer connection should not be maintained with a UE, if the UE is classified as a stationary device, the telecommunications network establishes a spatial multiplexing single layer (SMSL) connection with the UE. If the UE is classified as a mobile device, the telecommunications network establishes a single input, single output (SISO) connection with the UE.

20 Claims, 6 Drawing Sheets

500

500

510

CLASSIFY UEs AS EITHER STATIONARY
DEVICES OR MOBILE DEVICES

520

DETERMINE THAT ONE OR MORE NETWORK
PARAMETERS ARE BELOW A PREDETERMINED
THRESHOLD

530

ESTABLISH EITHER A SISO OR SMSL
CONNECTION WITH THE UE DEPENDING
ON ITS DEVICE TYPE

600

610

RECEIVE A CAPABILITY MESSAGE FROM A UE

620

DETERMINE THAT ONE OR MORE NETWORK PARAMETERS ARE BELOW A PREDETERMINED THRESHOLD

630

ESTABLISH EITHER A SISO OR SMSL CONNECTION WITH THE UE BASED ON THE CAPABILITY MESSAGE AND THE DETERMINATION

SELECTING SINGLE-LAYER UPLINK TRANSMISSION MODES BASED ON DEVICE TYPES

SUMMARY

The present disclosure is directed, in part, to forming different types of single-layer connections between user equipment (UEs) and a telecommunications network depending on the UEs' device types, substantially as shown in and/or described in connection with at least one of the figures, and as set forth more completely in the claims.

In aspects set forth herein, UEs are classified as either stationary devices or mobile devices. For a given UE, if a dual-layer connection to a telecommunications network is unavailable or unable to be maintained by the UE, the network forms a single-layer connection with the UE. If the UE is a stationary device, such as a fixed wireless access (FWA) device, the network forms a spatial multiplexing single layer (SMSL) connection with the UE. If the UE is a mobile device, such as a mobile phone, the network forms a single input, single output (SISO) connection with the UE.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
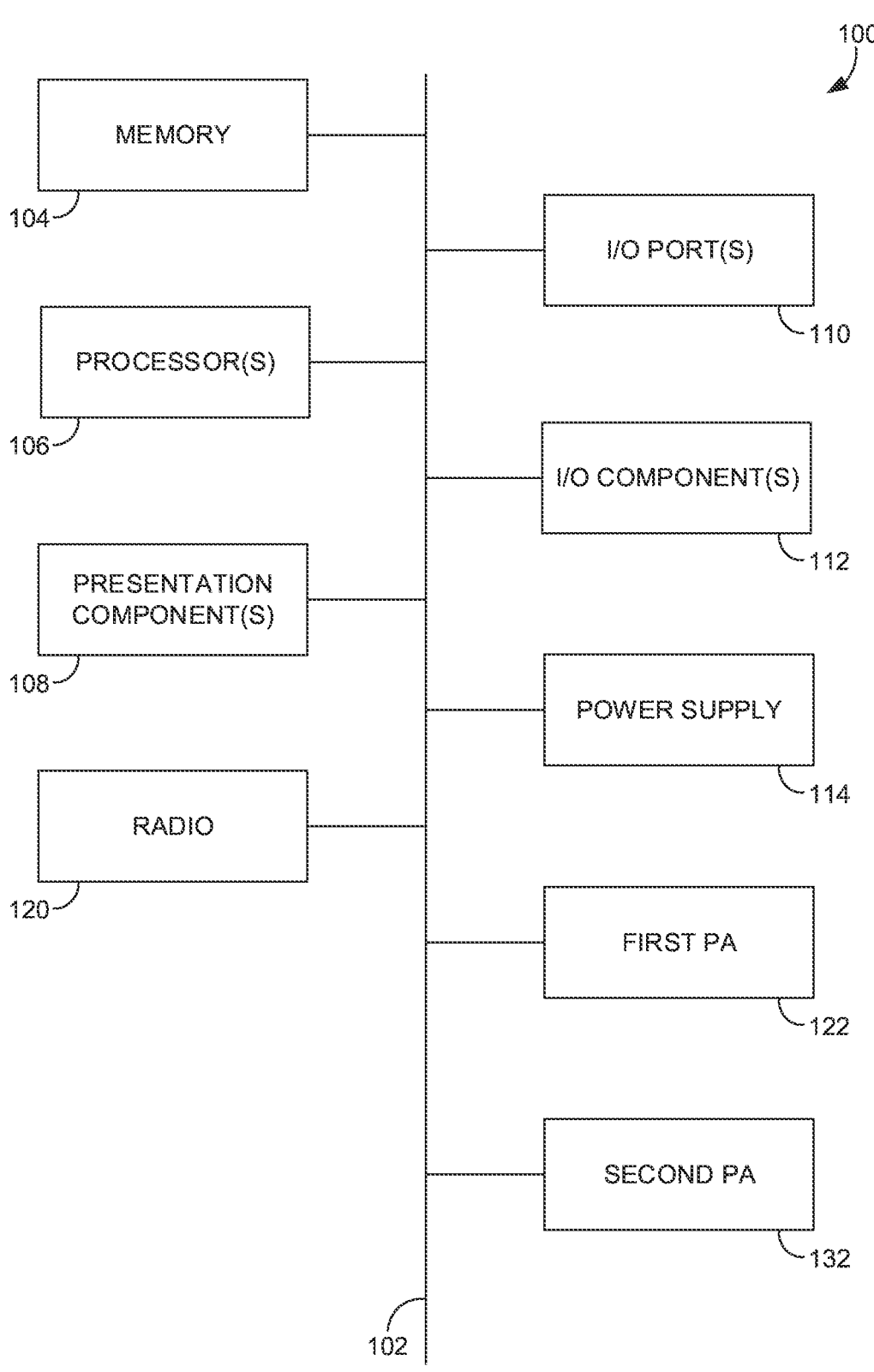
FIG. 1 depicts an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, when a user equipment (UE) equipped with multiple antennas is unable to form a multi-layer connection with a radio access network (RAN) node of a telecommunications network, the UE forms either a spatial multiplexing single layer (SMSL) or a single input, single output (SISO) connection with the RAN node. Traditional systems prefer SMSL connections in the interest of maximizing throughput. However, based on field testing conducted by the inventors, when the UE is a mobile device, SMSL typically provides only marginal throughput gains compared to SISO and negatively impacts UE battery life.

In order to solve these problems, the present disclosure is directed to systems, methods, and computer-readable media that improve conventional UE connection methods by optimizing network-side and/or UE-side parameters to provide sufficient throughput without excessively sacrificing UE battery life. At a high level, UEs are classified as either stationary devices or mobile devices. Battery life is typically not relevant to stationary devices (since such devices are normally connected to external power), so stationary devices are configured to use SMSL instead of SISO. Mobile devices, on the other hand, are not typically connected to external power, and thus are configured to use SISO instead of SMSL.

Accordingly, a first aspect of the present disclosure is directed to a method for establishing single-layer connections with user equipment (UEs). A plurality of UEs are classified as either stationary devices or mobile devices. It is determined that a stationary device is unable to maintain a dual-layer connection to a RAN node, and that a mobile device is likewise unable to maintain a dual-layer connection to the RAN node. An SMSL connection is established between the stationary device and the RAN node, and a SISO connection is established between the mobile device and the RAN node.

A second aspect of the present disclosure is directed to a second method for establishing a SISO connection between a UE and a RAN node. A capability message for a UE is received from the UE. The capability message comprises an information element (IE) indicating that a SISO connection should be formed with the UE instead of an SMSL connection when the UE is unable to maintain a dual-layer connection. It is determined that the UE is unable to maintain a dual-layer connection with a RAN node of a telecommunications network, and a SISO connection is established between the UE and the RAN node.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to a an access point and receive one or more signals from the access point (or some other access point); the computing device 100 may be referred to herein as a user equipment, wireless communication device, or user device, The computing device 100 may take many forms; non-limiting examples of the computing device 100 include a cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100.

Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate with a wireless network on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VOIP communications. In aspects, the first radio 120 and the second radio 130 may be configured to communicate using the same protocol but in other aspects they may be configure dot communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies.

Figure 2:
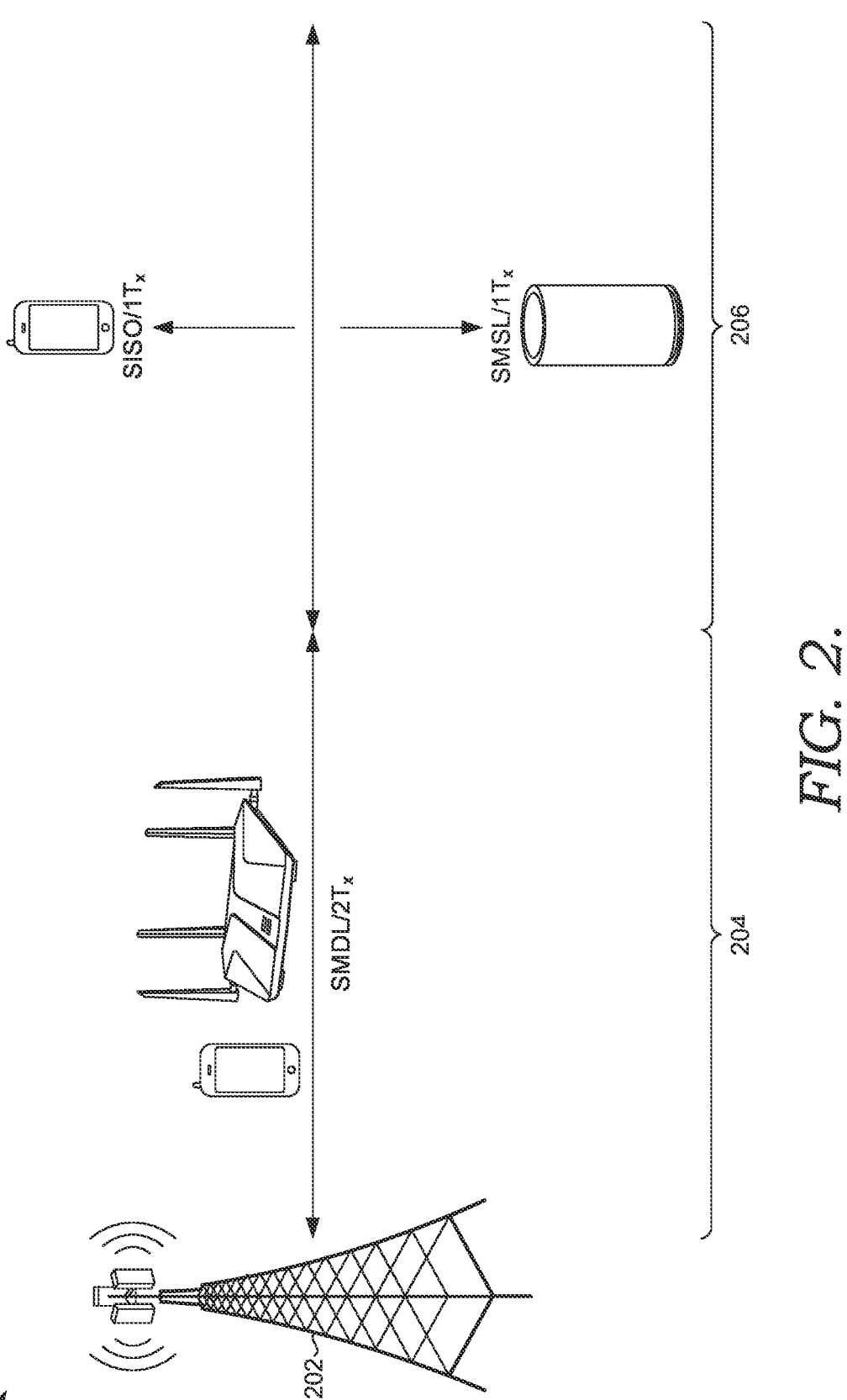
FIG. 2 depicts an exemplary network in which implementations of the present disclosure may be employed.

Turning now to FIG. 2, an exemplary network environment 200 is provided. By way of background, some user equipment (UEs) are equipped with multiple antennas. In some cases, this allows such UEs to form multiple input, multiple output (MIMO) connections with radio access network (RAN) nodes 202 of cellular networks. That is, a UE may simultaneously utilize multiple antennas to send and/or receive data to/from a RAN node 202 (which may, in turn, communicate with the UE using multiple antennas).

In some cases, a UE simultaneously transmits multiple distinct data streams to a RAN node 202 using its respective antennas. The case in which exactly two data streams (or "layers") are transmitted is referred to as spatial multiplexing, dual layer (SMDL). This approach leverages the UE's multiple antennas to increase bandwidth (and thus, all else being equal, data transmission speeds). In other cases, a UE sends a single data stream to a RAN node 202 using two antennas, providing redundancy that can reduce error rates and increase signal-to-noise ratio, among other benefits. This is referred to as spatial multiplexing, single layer (SMSL). SMSL stands in contrast to more traditional single input, single output (SISO) data transmission methods, which utilize only one UE antenna.

Because SMDL allows multiple data streams to be transmitted at once, telecommunications networks typically prefer to interact with UEs via SMDL. But this is only possible under sufficient radio frequency (RF) conditions. For example, if a UE is too far from a RAN node and/or there are physical obstructions between the UE and RAN node 202, SMDL may not be optimal (or possible). In such cases, conventional telecommunications networks apply a blanket policy: SMSL is utilized when supported by the UE (since SMSL's utilization of multiple antennas often results in superior throughput compared to SISO). SISO connections are formed with devices that do not have sufficient antenna capabilities (e.g., only have one antenna).

Based on field testing conducted by the inventors, there are two problems with this approach. First, mobile devices (e.g., cell phones) tend to be in motion, which (among other factors) can substantially mitigate improvements in throughput offered by SMSL compared to SISO. Second, because SMSL transmits data using multiple antennas, it consumes more power relative to SISO. This is particularly problematic for mobile devices, which typically draw their electrical power from batteries and are not connected to external power sources.

Based on these findings, the inventors have determined that, on balance, SISO's power savings outweigh SMSL's relatively marginal throughput gains. In contrast, stationary devices, such as fixed wireless access (FWA) devices, are not typically in motion and are almost always connected to external power sources. Thus, SMSL is preferable for stationary devices.

Accordingly, the embodiments described herein improve upon conventional UE-network communication methods by, for example, partitioning UEs into two groups: stationary devices and mobile devices. The network and/or UEs are configured such that, when SMDL is not optimal, stationary devices utilize SMSL while mobile devices use SISO.

To illustrate, FIG. 2 shows a RAN node 202, a first area 204 proximate to the RAN node 202, and a second area 206 further from the RAN node 202. As shown, both stationary devices and mobile devices may interact with the RAN node 202 via SMDL in the first area 204 (e.g., when close enough to the RAN node 202). But in the second area 206, where SMDL is no longer preferred, stationary devices utilize SMSL, while mobile devices use SISO. For example, in some embodiments, a first network slice is created to connect to stationary devices via SMSL, and a second network slice is created to connect to mobile devices via SISO.

Although FIG. 2 shows dual-layer and single-layer connections as being formed in two spatially distinct areas (i.e., 202 and 204), this is merely for purposes of illustration. In some embodiments, a UE's distance from a RAN node 202 is only one of several factors that may be taken into account when determining that the UE should be switched from a multi-layer connection to a single-layer connection with the RAN node 202.

For example, in some embodiments, it is determined that one or more network parameters for a multi-layer (e.g., SMDL) connection between the UE and the RAN node 202 are below a predetermined threshold. The one or more network parameters may comprise a distance between the UE and the RAN node, signal-to-interference-plus-noise ratio (SINR), reference signal received power (RSRP), reference signal received quality (RSRQ), and/or any other key performance indicator (KPI) chosen by a telecommunications network operator. Based on this determination, the UE can be switched from a multi-layer connection to a single-layer connection.

Figure 3:
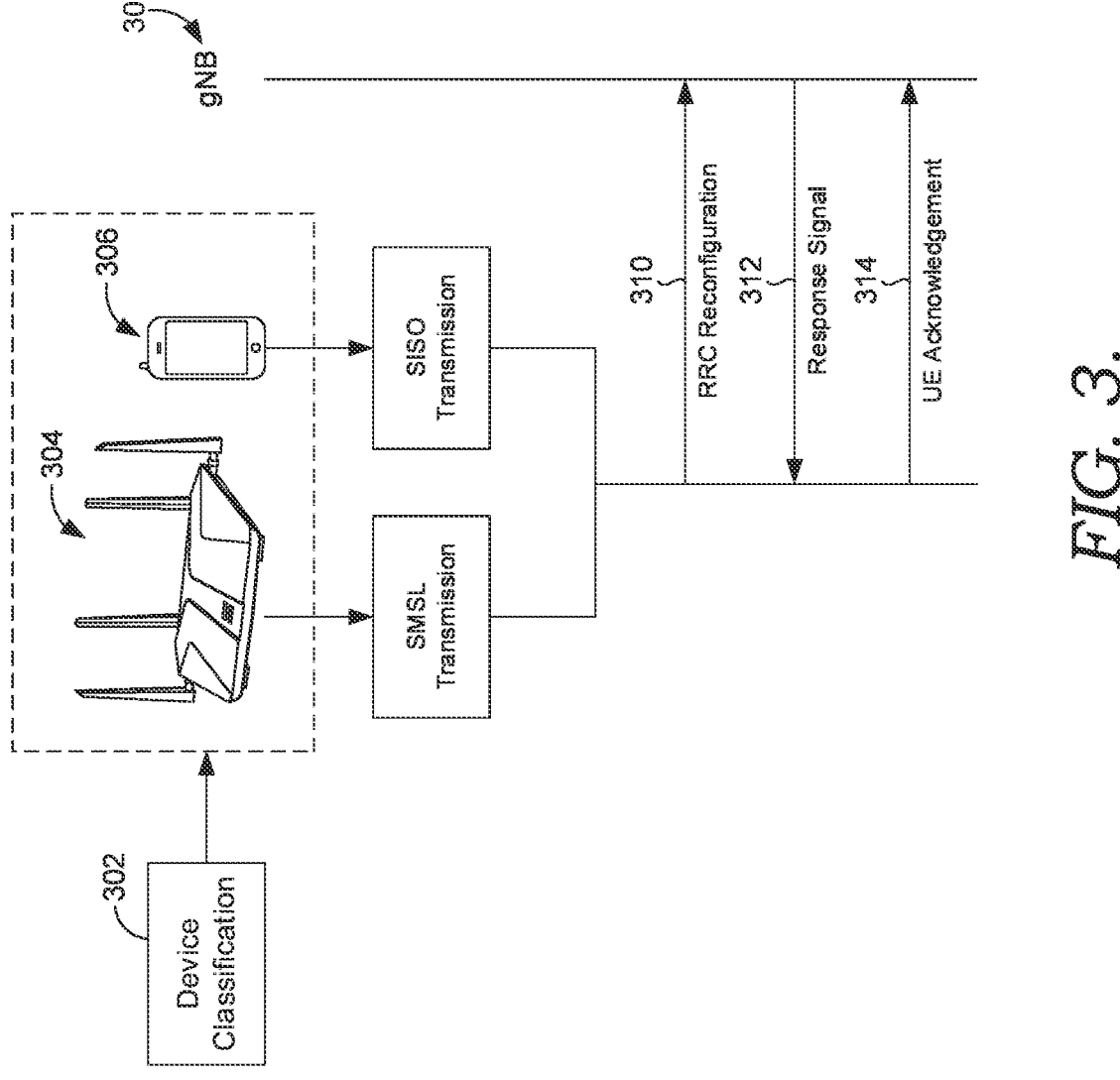
FIG. 3 is a diagram depicting exemplary methods by which communications may be established between user equipment and a gNobeB in accordance with aspects herein.

Turning now to FIG. 3, a diagram 300 is provided showing exemplary methods of forming a connection between a UE and a telecommunications network based on a device type of the UE.

Initially, at block 302, a device (e.g., a UE) is classified based on its device type. In some aspects, the UE is classified as either a stationary device 304 or a mobile device 306. A UE can be classified based on device type information, which can include any of the following, without limitation: a subscriber identity module (SIM) profile for the UE, a type allocation code (TAC) for the UE, and UE capability information. To illustrate, if the UE is a fixed wireless access (FWA) device or customer premises equipment (CPE), it may be classified as a stationary device 304. But if the UE is, for example, an enhanced mobile broadband (eMBB) device, such as a mobile phone, it may be classified as a mobile device 306.

As further discussed below in regard to FIG. 4, device type information can be received from the UE (e.g., via a UE capability message) and/or retrieved by a unified data management (UDM) function. For example, device type information may be received from the UE, stored in the telecommunications network, and retrieved by the UDM during a device classification step 302.

As part of the process of establishing the proper type of connection (i.e., SMSL for stationary devices and SISO for mobile devices), the UE and RAN node (which is a gNodeB 308 in the example shown in FIG. 3) may exchange any of several communications. The UE may transmit a radio resource control (RRC) configuration message 310 to the RAN node. This may cause the RRC, which is a protocol layer that defines the manner of interaction between a UE and RAN node, to update network-side parameters that permit the formation of the requested type of connection with the UE. Once the parameters have been updated, the network (via the RAN node) transmits a response signal 312 to the UE confirming the network-side reconfiguration. To complete the setup process, the UE transmits a UE acknowledgement message 314 to the RAN node confirming that the reconfiguration is complete and that the UE is ready to communicate with the RAN node using the chosen method.

In some embodiments, a mobile device may be reclassified as a stationary device. For example, if a mobile device is connected to an external power source, it is less likely to be in motion (e.g., because it may be physically tethered to a power outlet) and may not need to conserve power. Accordingly, after being connected to an external power source, a UE classified as a mobile device may transmit, to a network (e.g., via a RAN node), (a) an indication that the mobile device has been connected to an external power source and/or (b) a request (e.g., an RRC reconfiguration request 310) to switch to SMSL. In response, the network may reclassify the UE as a stationary device and/or establish an SMSL connection with the UE (e.g., as previously described in regard to FIG. 3).

Likewise, when the UE classified (or previously classified) as a mobile device is disconnected from the external power source, the UE may transmit, to the network (e.g., via the RAN node), (a) an indication that the UE has been disconnected from the external power source and/or (b) a request (e.g., an RRC reconfiguration request 310) to switch to SISO. In response, the network may reclassify the UE as a mobile device and/or establish a SISO connection with the UE (e.g., as previously described in regard to FIG. 3).

UEs can also be classified or reclassified based on device mobility. For example, a first location of a UE may be determined at a first time, and a second location of the UE may be determined at a second (e.g., later) time. If the first and second locations of the UE differ (e.g., by at least a threshold distance), the UE may be classified or reclassified as a mobile device—e.g., even if the UE was previously classified as a stationary device. Similarly, if the first and second locations are sufficiently close to each other (e.g., are below a threshold distance from one another), the UE may be classified or reclassified as a stationary device—e.g., even if the UE was previously classified as a mobile device.

Figure 4:
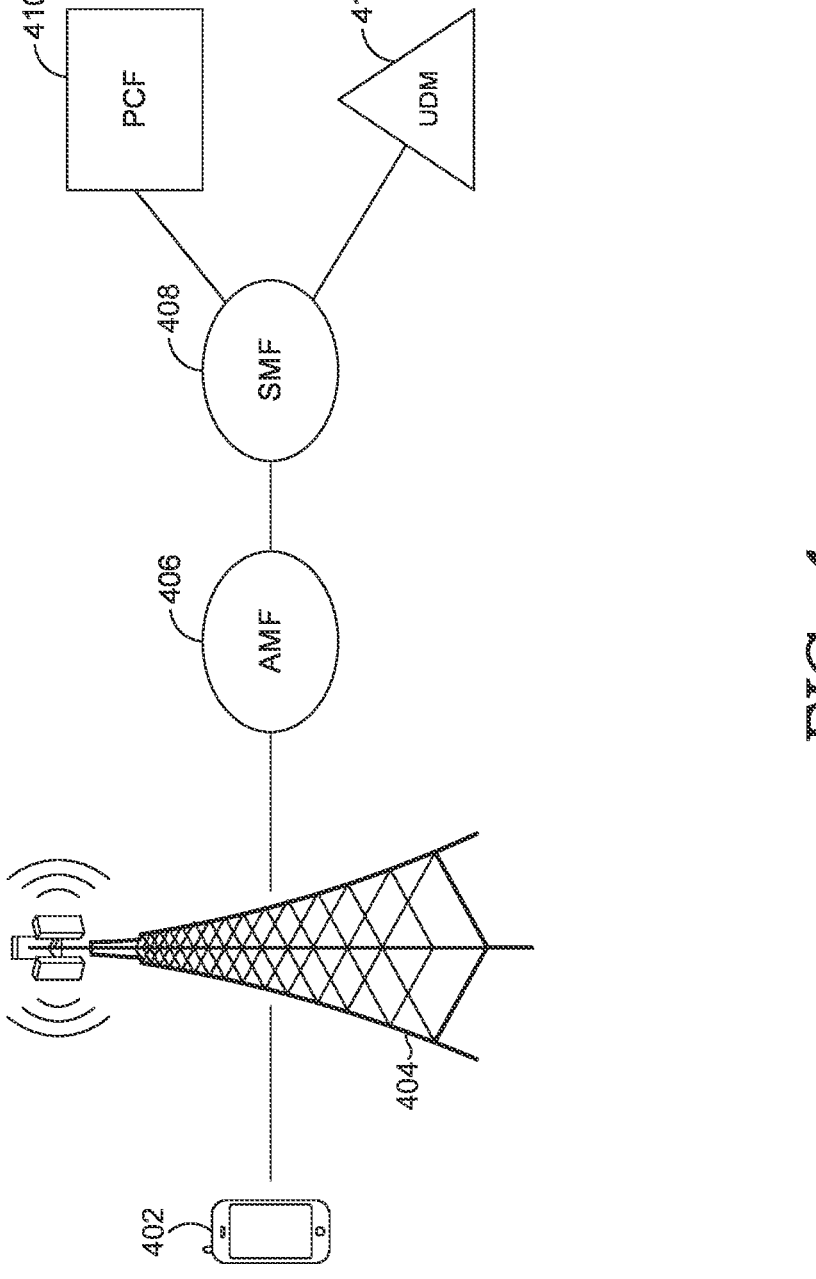
FIG. 4 depicts an exemplary network in which implementations of the present disclosure may be employed.

Turning now to FIG. 4, an embodiment of a network environment in which the present disclosure may be employed is illustrated. Such a network environment is illustrated and designated generally as network environment 400. Network environment 400 is but one example of a suitable network environment and is not intended to suggest any limitation as to the scope of use or functionality of the invention. Neither should the network environment be interpreted as having any dependency or requirement relating to any one or combination of components illustrated.

The network environment 400 generally represents a communication model for interaction between a UE 402, a RAN node 404, an access mobility function (AMF) 406, a session management function (SMF) 408, a policy control function (PCF) 410, and a unified data management (UDM) function 412 in accordance with aspects described herein. These network functions (e.g., AMF, SMF, PCF, and UDM) may each correspond to one or more computer processing components, storage components, and/or software instances that have a functionally-defined behavior and communication interface—e.g., in 3GPP/5G networks.

As discussed, in some embodiments, the UE 402 provides device type information to the network via the RAN node 404. The resulting classification and/or connection reconfiguration process may include interactions between the AMF 406, the SMF 408, and the UDM 412. The AMF 406 may receive device type and/or connection-related information from the UE 402 via the RAN node 404. The AMF 406 may relay that information to the SMF 408, which can interact with the PCF 410 and UDM 412. The PCF 410 may store one or more policies, such as a policy to form SMSL connections with stationary devices and form SISO connections with mobile devices, as previously discussed with respect to FIGS. 2-3. The PCF 410 may provide one or more instructions to the SMF 408 to enforce the one or more policies.

In some cases, the SMF 408 also utilizes the UDM 412—e.g., to retrieve device information corresponding to the UE 402. For example, if the network (e.g., the AMF 406) determines that the UE 402 is unable to maintain a multilayer (e.g., SMDL) connection with the RAN node 404, the SMF 408 may utilize the UDM 412 to determine whether the UE 402 is classified as a stationary device or a mobile device. The SMF 408 may relay that information to the AMF 406 such that the appropriate type of connection is formed between the RAN node 404 and the UE 402.

Embodiments so far discussed have related to utilizing network-side components to classify devices and forming particular types of UE-RAN node connections based on those classifications. But in other embodiments, the UE 402 instructs the network to form an SMSL or SISO (as applicable) connection. Such an instruction can be based on any of the factors previously discussed. For example, if the UE 402 is a mobile phone, the UE 402 may be configured to, based on the UE 402 being a mobile phone, transmit an instruction to the RAN node 404 to form a SISO connection with the UE 402.

This can be accomplished by configuring the UE 402 to include an additional information element (IE) in its UE capabilities message. The IE can indicate whether the UE 402 prefers SMSL or SISO when SMDL is not preferred. As discussed, the UE 402's choice as to whether to select SMSL or SISO can be based on the UE's device type (e.g., stationary or mobile). The value selected for the IE by the UE 402 can be stored by the UDM 412 after being received by the network via the RAN node 404. Thus, when the UE 402 is ready to switch from a multi-layer connection to a single-layer connection, the network can identify the UE's preferred single-layer connection type without classifying the UE 402 and/or retrieving classification information for the UE 402.

Figure 5:
FIGS. 5-6 depict flow diagrams of exemplary methods for establishing network connections with user equipment in accordance with aspects herein.
Figure 5:
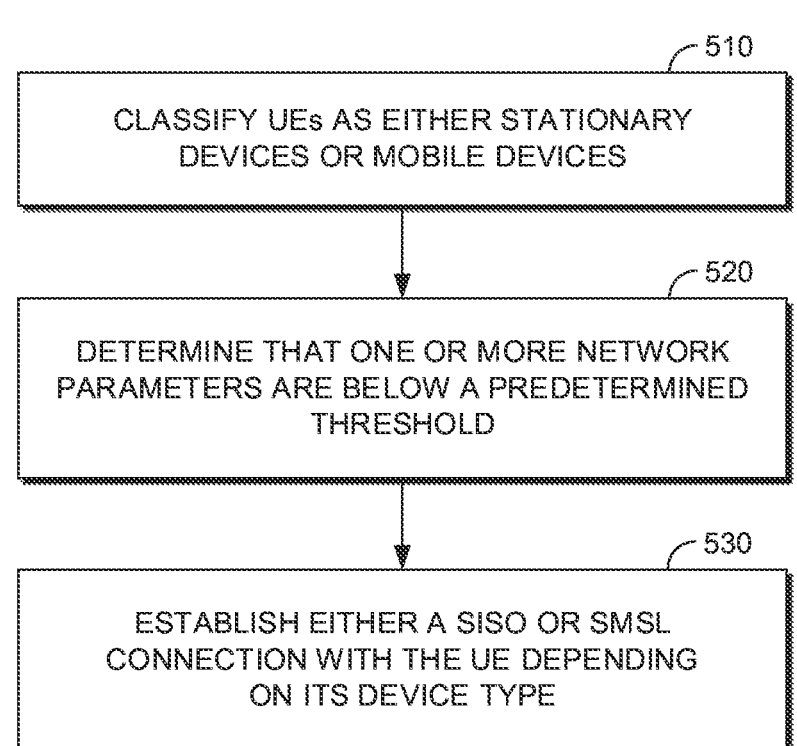

Turning now to FIG. 5, a flow chart is provided for a method 500 for forming a single-layer connection with a UE.

At a first step 510, UEs are classified as either stationary devices or mobile devices. For example, FWA devices and CPE can be classified as stationary devices, while mobile phones can be classified as mobile devices. In some embodiments, mobile devices (e.g., mobile phones) can be classified or reclassified as stationary devices when connected to external power sources.

At a second step 520, it is determined that one or more network parameters for a connection (e.g., a multi-layer connection) between a UE of the plurality of UEs and a RAN node are below a predetermined threshold. The connection can be an uplink connection. The one or more network parameters may comprise a distance between the UE and the RAN node, signal-to-interference-plus-noise ratio (SINR), reference signal received power (RSRP), reference signal received quality (RSRQ), and/or any other key performance indicator (KPI) chosen by a telecommunications network operator, for example.

At a third step 530, either an SMSL connection or a SISO connection (each of which can be an uplink connection) is formed between the RAN node and the UE depending on a device type of the UE. If the UE is classified (e.g., per the classification step 510) as a stationary device, an SMSL connection may be established. If the UE is classified as a mobile device, a SISO connection may be established.

Figure 6:
Figure 6:
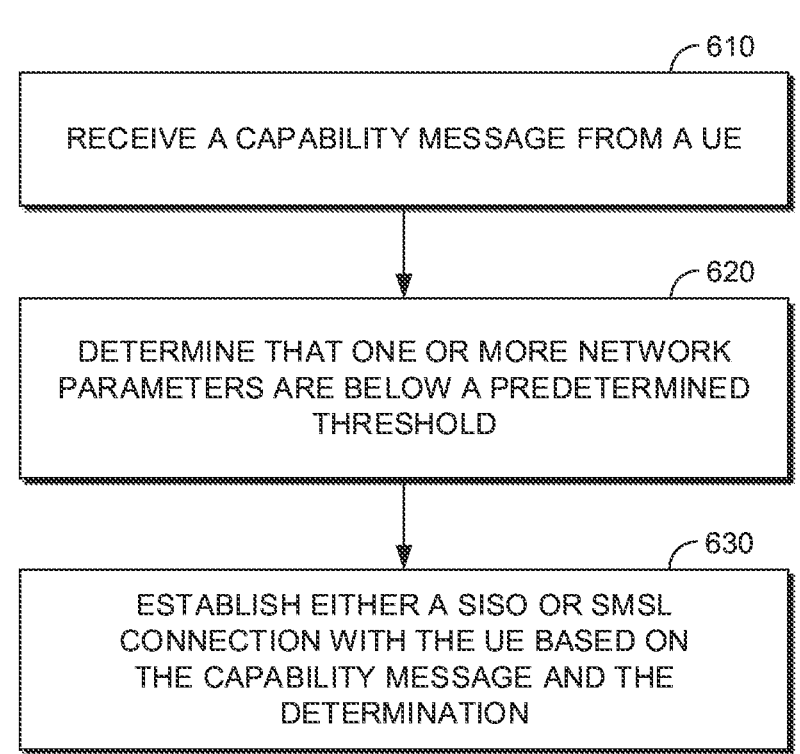

Turning now to FIG. 6, a flow chart is provided for a method 600 for establishing a single-layer connection with a UE based on a UE capability message.

At a first step 610, a capability message is received from a UE. The capability message can include an information element (IE) that indicates whether the UE prefers an SMSL connection or a SISO connection (e.g., uplink connection) when a dual-layer connection is not possible. The UE can be configured to prefer SMSL when the UE is a stationary device and can be configured to prefer SISO when the UE is a mobile device. Following receipt of the capability message (e.g., by a RAN node), the UE's single-layer connection preference can be stored by a UDM of a telecommunications network.

At a second step 620, it is determined that one or more network parameters for a connection (e.g., a multi-layer connection) between a UE of the plurality of UEs and a RAN node are below a predetermined threshold. The one or more network parameters may comprise a distance between the UE and the RAN node, signal-to-interference-plus-noise ratio (SINR), reference signal received power (RSRP), reference signal received quality (RSRQ), and/or any other key performance indicator (KPI) chosen by a telecommunications network operator, for example.

At a third step 630, either an SMSL connection or a SISO connection is formed between the RAN node and the UE based on the capability message and the determination.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method comprising:

classifying a plurality of user equipment (UEs) as either stationary devices or mobile devices;

determining that one or more network parameters of a first multi-layer connection between a stationary device and a radio access network (RAN) node are below a first predetermined threshold;

determining that one or more network parameters of a second multi-layer connection between a mobile device and the RAN node are below a second predetermined threshold;

instructing the stationary device to switch from the first connection to a single multiplexing single layer (SMSL) connection between the stationary device and the RAN node based on (a) the classification of the stationary device and (b) the determination that the one or more network parameters for the first connection are below the first threshold; and instructing the mobile device to switch from the second connection to a single input, single output (SISO) connection between the mobile device and the RAN node based on (a) the classification of the mobile device and (b) the determination that the one or more network parameters for the second connection are below the second threshold.

2. The method of claim 1, further comprising:

receiving an indication that the mobile device has been connected to external power source; and based on the indication, deactivating the SISO connection and establishing a second SMSL connection between the mobile device and the RAN node.

3. The method of claim 2, further comprising:

receiving a second indication that the mobile device has been disconnected from the external power source; and based on the second indication, deactivating the second SMSL connection and reestablishing the SISO connection.

4. The method of claim 1, further comprising:

receiving an indication that the mobile device has been connected to an external power source; and based on the indication, reclassifying the mobile device as a stationary device.

5. The method of claim 1, wherein the determination that the one or more network parameters are below the second threshold is based at least in part on a distance between the mobile device and the RAN node.

6. The method of claim 1, wherein the classification of the plurality of UEs is based on subscriber identity module (SIM) profiles and/or type allocation codes (TACs) for the plurality of UEs.

7. The method of claim 1, wherein a first UE of the plurality of UEs is classified as the stationary device based on a determination that the first UE is a fixed wireless access (FWA) device.

8. The method of claim 1, wherein a second UE of the plurality of UEs is classified as the mobile device based on a determination that the second UE is a mobile phone.

9. The method of claim 1, wherein the classification of the plurality of UEs is performed at least in part by a unified data management (UDM) function in a telecommunications network.

10. The method of claim 1, wherein the switching to the SMSL connection is based at least in part on an instruction from a policy control function (PCF) in a telecommunications network.

11. The method of claim 1, further comprising:

creating a first network slice for stationary devices, including the stationary device, such that the stationary devices connect to the first network slice via SMSL connections; and creating a second network slice for mobile devices, including the mobile device, such that the mobile devices connect to the second network slice via SISO connections.

12. One or more non-transitory computer-readable media having instructions stored thereon that, when executed by one or more computer processing components, cause a user equipment (UE) to perform a method comprising:

transmitting, to a RAN node of a telecommunications network, device type information for the UE such that the UE is classified as a mobile device;

reporting, to the RAN node, one or more network parameters of a multi-layer connection between the UE and the RAN node; and receiving an instruction to switch from the multi-layer connection to a single input, single output (SISO) connection with the RAN node, wherein the instruction is based on (a) the classification of the UE as a mobile device and (b) the one or more network parameters; and based on the instruction, switching to the SISO connection between the UE and the RAN node.

13. The one or more non-transitory computer-readable media of claim 12, the method further comprising:

transmitting, to the RAN node, an indication that the UE has been connected to an external power source, wherein the indication causes the RAN node to deactivate the SISO connection and establish a spatial multiplexing single layer (SMSL) connection between the UE and the RAN node.

14. The one or more non-transitory computer-readable media of claim 12, wherein the device type information is a type allocation code (TAC) for the UE.

15. The one or more non-transitory computer-readable media of claim 12, wherein the switching to the SISO connection comprises connecting to a network slice of the telecommunications network, wherein the network slice is dedicated to mobile devices that are connected to the telecommunications network via SISO.

16. A method comprising:

classifying a user equipment (UE) as either a stationary device or a mobile device;

determining that one or more network parameters of a multi-layer connection between the UE and a radio access network (RAN) node are below a predetermined threshold;

if the UE is classified as a stationary device, instructing the UE to switch from the multi-layer connection to a spatial multiplexing single layer (SMSL) connection with the RAN node based on the determination that the one or more network parameters are below the predetermined threshold; and if the UE is classified as a mobile device, instructing the UE to switch from the multi-layer connection to a single input, single output (SISO) connection with the RAN node based on the determination that the one or more network parameters are below the predetermined threshold.

17. The method of claim 16, wherein the one or more network parameters comprise at least one selected from the following: a distance between the UE and the RAN node, signal-to-interference-plus-noise ratio (SINR), reference signal received power (RSRP), and reference signal received quality (RSRQ).

18. The method of claim 16, wherein the classifying the UE is based on device mobility of the UE.

19. The method of claim 18, further comprising determining the device mobility of the UE by:

determining a first location of the UE at a first time;

determining a second location of the UE at a second time subsequent to the first time;

if the first location and the second location are separated by at least a threshold distance, classifying the UE as a mobile device; and if the first location and the second location are not separated by at least the threshold distance, classifying the UE as a stationary device.

20. The method of claim 16, further comprising:

receiving an indication that the UE has been connected to external power source; and if the UE is classified as a mobile device, based on the indication, deactivating the SISO connection and establishing an SMSL connection between the UE and the RAN node.

* * * * *